Dec. 20, 1955 — C. M. SUSIL — 2,727,335
MACHINE FOR TRIMMING PALM TREE TRUNKS
Filed Dec. 2, 1952 — 3 Sheets-Sheet 1

Charles M. Susil
INVENTOR.

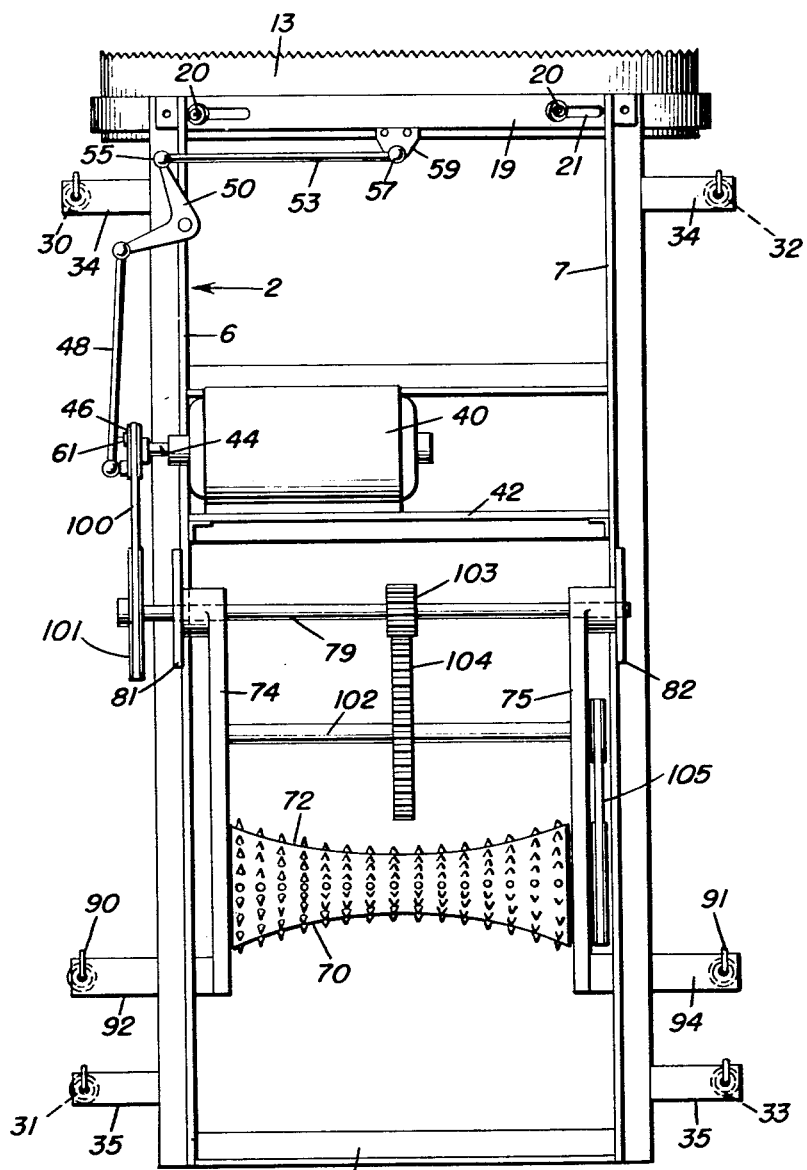

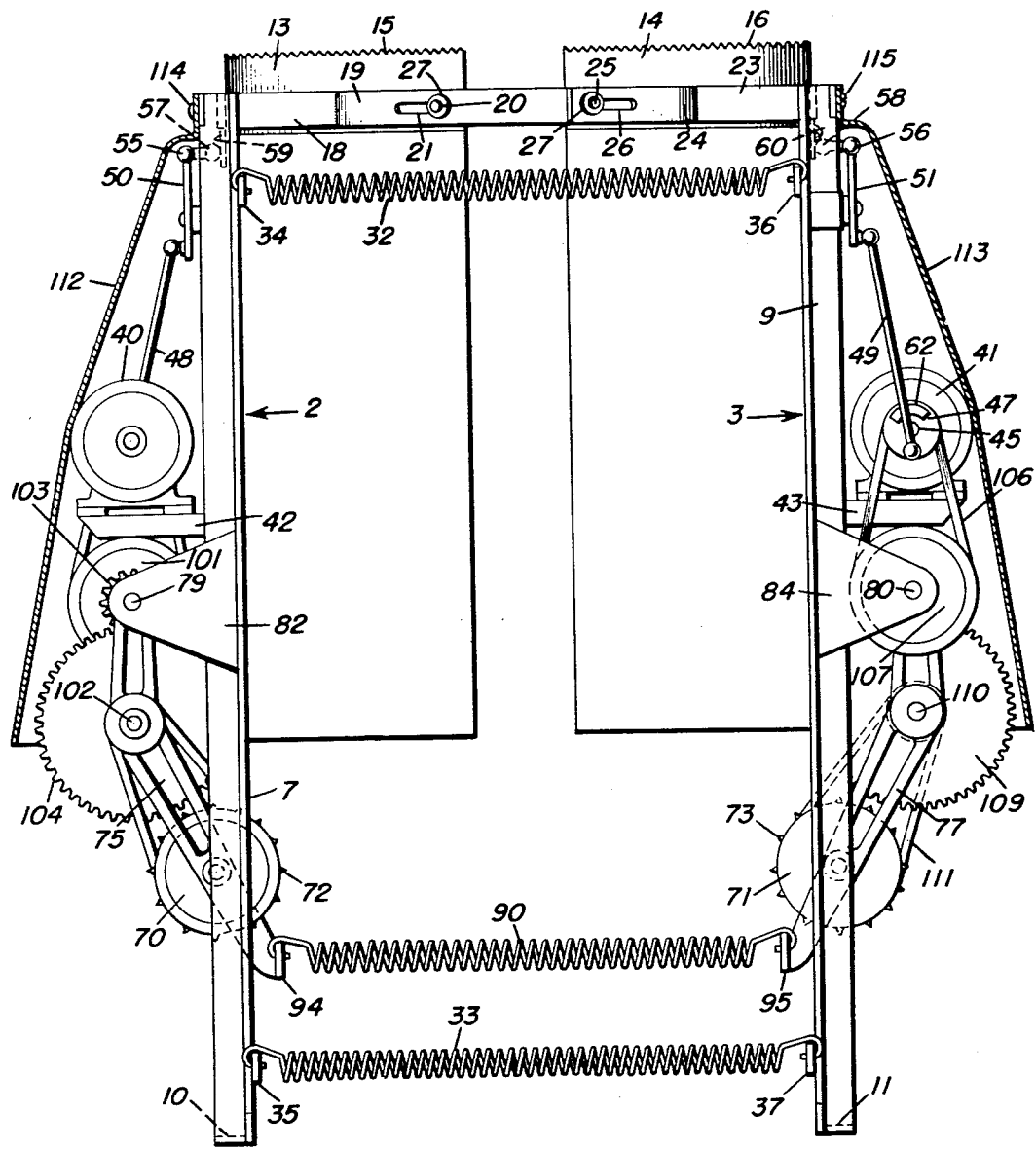

United States Patent Office 2,727,335
Patented Dec. 20, 1955

2,727,335

MACHINE FOR TRIMMING PALM TREE TRUNKS

Charles M. Susil, Alamo, Tex.

Application December 2, 1952, Serial No. 323,639

4 Claims. (Cl. 47—1)

My invention relates to improvement in machines for trimming fronds from palm tree trunks.

By way of explanation, as certain species of palm trees grow, the new fronds grow from the top and those below the new fronds will die. These dead fronds are objectionable because the same are unsightly and dust collectors and it is the practice to remove the same, usually by hand, which is dangerous and unpleasant because of the height of such trees and further because the same are infested with many tropical insects.

The primary object of my invention is to provide a labor saving machine operative to be propelled up the trunks of such trees and saw off the dead fronds with a reciprocating sawing action to cleanly and quickly remove the dead fronds close to the trunks.

Another object is to provide a machine in which the dead fronds are removed by saw blades reciprocating on opposite sides of the tree trunk circumferentially of the trunk as the machine is propelled up the trunk, whereby to facilitate trimming off the dead fronds growing spirally around the trunks.

Still another object is to provide in such a machine means for propelling the machine up the tree trunks without danger of the machine slipping downwardly.

Still another object is to provide a machine for the above purposes which is safe to use, comparatively simple in construction, easy to apply to tree trunks and remove therefrom and inexpensive to manufacture and service.

Other and subordinate objects, together with the precise nature of my improvements will be readily understood when the succeeding description and claims are read with reference to the drawings accompanying and forming part of this specification.

In said drawings;

Figure 3 is a view and side elevation of the same;

Figure 4 is a view of the same with the machine turned through an angle of 90 degrees.

Figure 1:
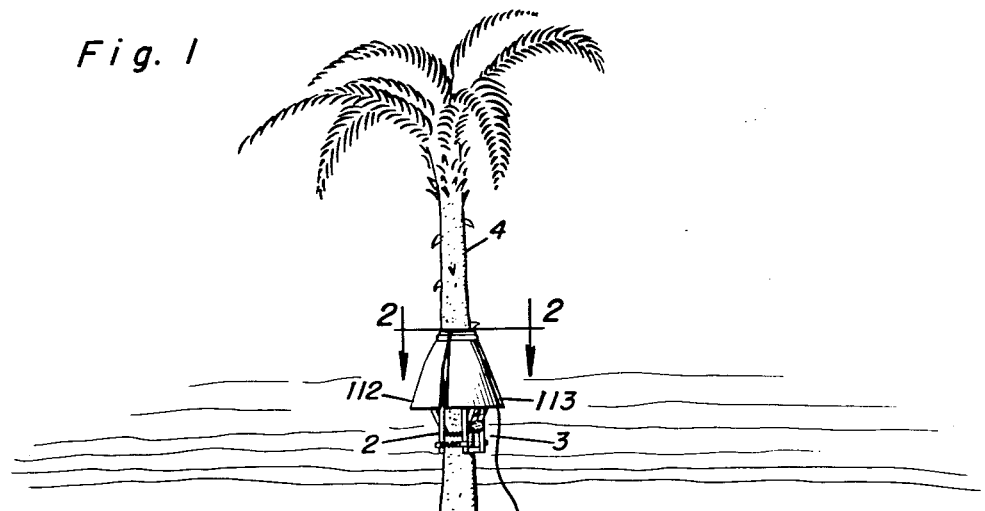
Figure 1 is a view and side elevation of my improved trimming machine in the preferred embodiment thereof applied.
Figure 2:
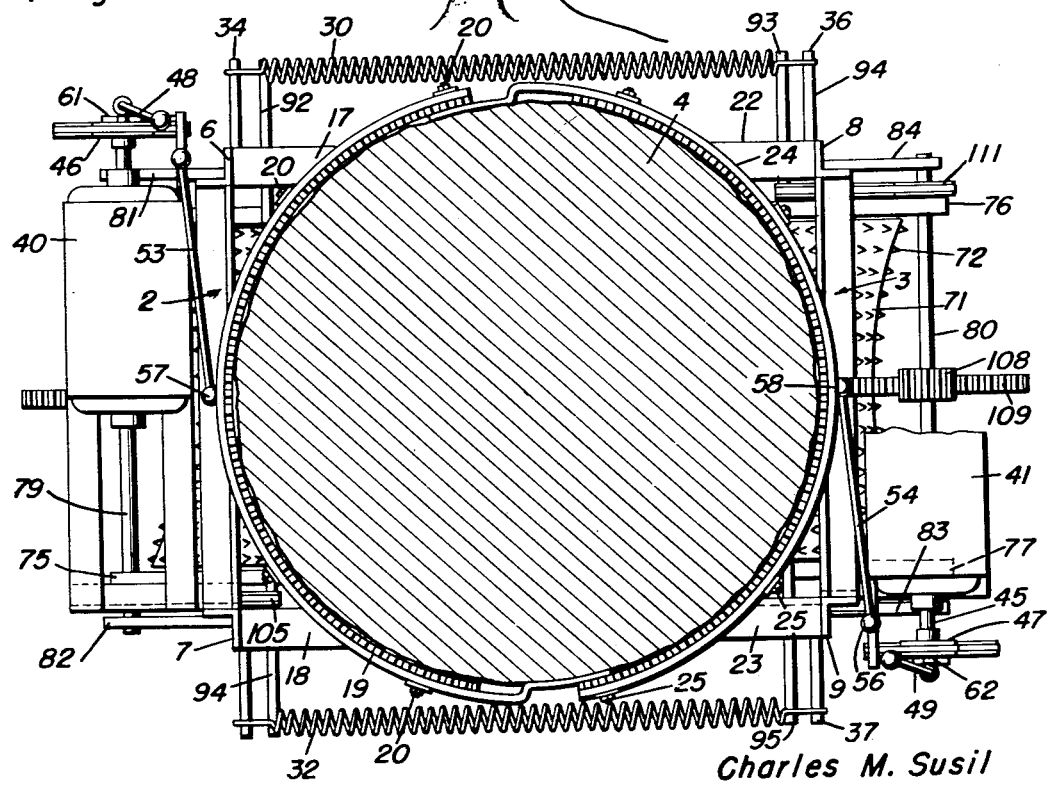
Figure 2 is an enlarged view in horizontal section taken on the lines 2—2 of Figure 1.

Referring now to the drawings by numerals, the machine of my invention comprises, as its basic components, a pair of elongated opposite frames 2, 3, adapted to be opposed in upright position on opposite sides of the trunk 4 of a palm tree of average size when full grown. The frames 2, 3, each include a pair of laterally spaced upright, angle iron, side bars designated 6, 7, in the case of frame 2 and 8, 9, in the case of frame 3. An angle iron bar 10 connects the lower end of the side bars 6, 7, of frame 2, and a similar bar 11 connects the lower ends of the side bars 8, 9, of frame 3. A pair of arcuate saw blades 13, 14, with saw toothed edges 15, 16, uppermost are provided at the upper ends of the frames 2, 3, for reciprocation end-wise at opposite sides of the trunk 4 circumferentially of said trunk, and which conform substantially to the curvature of the trunk 4. The saw blade 13 is reciprocatably mounted on the upper ends of the side bars 6, 7, of frame 2 by means of right angled terminal arms 17, 18, projecting toward the trunk 4 from said side bars and which are cross-connected by a horizontal saw blade carrying band 19 suitably secured to said arms 17, 18, and which is arcuate like the saw blade 13 and has the saw blade 13 reciprocatably mounted thereon to slide against the rear side of said band 19 to work between said band and the trunk 4. The saw blade 13 is mounted on the band 19 by radial studs 20 on said blade working in longitudinal slots 21 in said band 19. The saw blade 14 is similarly mounted on the upper ends of the side bars 8, 9, of frame 3 by arms 22, 23, like the arms 17, 18, a band 24 like the band 19, and studs 25 and slots 26, like the studs 20 and slots 21. Washers 27 suitably fixed on the studs 20, 25, retain the studs in the slots 21, 26.

Means are provided for yieldingly urging the frames 2, 3, toward the trunk 4, comprising pairs of upper and lower horizontal coil springs 30, 31, 32, 33, the pairs being arranged on opposite sides of the frames 2, 3, and trunk 4, the pairs, 30, 31, being detachably attached at ends thereof, as shown, to upper and lower pairs of lateral ears 34, 35, on the side bars 6, 7, of frame 2, and the pairs 32, 33, being similarly attached to pairs of upper and lower similar ears 36, 37, on the side bars 8, 9, of frame 3. As will be see , the described coil springs 30, 31, 32, 33, provide resilient means for attaching the frames 2, 3, together and are detachable for detaching the frames from each other.

A power drive for the saw blades 13, 14, is provided on each frame 2, 3, comprising suitably electric motors 40, 41, associated with the saw blades 13, 14, respectively, and mounted on upper shelves 42, 43, on said frames 2, 3.

The armature shafts 44, 45, of the motors 40, 41, are provided with pulleys 46, 47, thereon. Vertical pitmans 48, 49, operatively connect the pulleys 46, 47, to pivoted bell cranks 50, 51, on the side bars 6, 9, of frames 2, 3, the bell cranks 50, 51, being operatively connected by horizontal rods 53, 54, swivelly jointed at one end, as at 55, 56, to said bell cranks 50, 57, and similarly jointed at the other ends as at 57, 58, to central depending ears 59, 60, on the saw blades 13, 14.

The electric motors 40, 41 are designed to be suitably wired to a remote dynamo and remotely controlled by any suitable means from the ground. The pulleys 46, 47, may be suitably counterbalanced as at 61, 62.

One end of each band 19, 24, under laps the adjacent end of the saw blades 13, 14, as the case may be, and is suitably slotted in a manner, not shown, but like said bands for extension of one of the studs 20, 25, therethrough, the arrangement being such that working spaces between the ends of the saw blades 13, 14, are bridged to provide for easy turning of the machine about the trunk 4.

Means for propelling the frames 2, 3, up the trunk 4 is provided comprising a pair of transverse, concave rollers 70, 71, associated with the frames 2, 3, respectively, and which are provided with sharp peripheral, radial teeth 72, 73. The rollers 70, 71, are suspended in the frames 2, 3, below the shelves 42, 43, by pairs of hanger bars 74, 75, 76, 77, in the lower ends of which pairs said rollers are journaled horizontally.

The pairs of hanger bars 74, 75, 76, 77, are pivotally suspended at upper ends thereof in the frames 2, 3, from rotary shafts 79, 80, traversing the frames 2, 3, below the shelves 42, 43, and journaled in pairs of outstanding bearing ears 81, 82, 83, 84, on said frames 2, 3, at opposite sides of said frames, the arrangement being such that said pairs of hanger bars 74, 75, and 76, and 77 are swingable toward and away from the trunk 4 to correspondingly swing said rollers 70, 71. Coil springs 90, 91, at opposite sides of the frames 2, 3, and which are detachably connected to lateral ears 92, 93, on the arms 74, 76, and to lateral ears 94, 95, on the arms 75, 77, urge said arms toward the trunk 4 to engage the rollers 70, 71, with opposite sides of said trunk.

The electric motors 40, 41, form parts of power drives for the rollers 70, 71, the remainder of which comprises the following.

The pulley 46 driven by the motor 40 is connected by a belt 100 to a larger pulley 101 on the shaft 79 driving a cross-shaft 102 journaled in hanger bars 74, 75, and connected by means of reduction gearing 103, 104 between said shafts 79, 102, to the shaft 102 which is drivingly connected to one end of roller 70 by a belt and pulley reduction drive 105. A belt 106 connects the pulley 47 to a larger pulley 107 on the shaft 80. Reduction gears 108, 109, connect the shaft 80 to a cross-shaft 110 journaled like the shaft 102 but in arms 76, 77, said shaft 110 being connected at one end by a reduction belt and pulley drive 111 to one end of the roller 109.

Suitable, flexible, pendent shields, 112, 113, are attached to the upper ends of the frames 2, 3, as at 114, 115, to protect the described motors 40, 41, and drives to the rollers 70, 71.

The operation of the described trimming machine will be readily understood. The motors 40, 41, drive the rollers 70, 71, oppositely relatively in a direction to cause the same to roll up opposite sides of the trunk 4, said rollers 70, 71, being tensioned by the springs 90, 91, to cause the teeth 72, 73, to bite into the trunk for traction. The springs 30, 31, 32, 33, tension the frames 2, 3, to urge the same toward the trunk 4 so that the rollers 70, 71, propel the frames 2, 3, upwardly along side the trunk 4 in upright position with the saw blades 13, 14, close to opposite sides of the trunk 4 to be reciprocated in the manner and by means described for trimming purposes. The motors 40, 41, it should be explained, are reversible and designed to be controlled by the aforementioned remote controls for reverse drive of the rollers 70, 71, to back the machine down the trunk 4 for detachment of the frames 2, 3, from each other as the occasion may require, by detaching the coil springs 30, 31, 32, 33, 90, 91.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In a machine for trimming tree trunks, a pair of arcuate upwardly cutting tree trimming saw blades, a pair of upright opposite frames connected together and adapted to be positioned at opposite sides of a tree trunk, means slidably mounting said saw blades on said frames transversely thereof for endwise reciprocation circumferentially of a tree trunk, rotary tree climbing means mounted on said frames and engageable with opposite sides of a tree trunk for moving said frames upwardly to correspondingly move said blades for cutting upwardly, and drive means on said frames operatively connected to said saw blades and said tree climbing means to reciprocate said saw blades while said frames are being moved upwardly by said tree climbing means.

2. The combination of claim 1, said first named means comprising a pair of arcuate bands secured to said frames, respectively, transversely thereof in inwardly offset relation thereto, and on which said saw blades are mounted and project upwardly above the same.

3. The combination of claim 1, said drive means comprising a pair of motors mounted on said frames, respectively, pitman drives operative by said motors, and operating connections between said pitman drives and said saw blades.

4. The combination of claim 3, and speed reduction drives from said motors to said tree climbing means for moving said frames upwardly at a slower speed than the speed at which said saw blades are reciprocated.

References Cited in the file of this patent
UNITED STATES PATENTS

| 157,703 | Stone | Dec. 15, 1874 |
| 364,834 | Maloy | June 14, 1887 |
| 860,359 | Dudley | July 16, 1907 |
| 1,299,289 | Berg | Apr. 1, 1919 |
| 2,174,525 | Padernal | Oct. 3, 1939 |
| 2,477,922 | Emery et al. | Aug. 2, 1949 |
| 2,482,392 | Whitaker | Sept. 20, 1949 |
| 2,534,595 | Hamilton | Dec. 19, 1950 |
| 2,541,767 | Jones | Feb. 13, 1951 |
| 2,581,479 | Grasham | Jan. 8, 1952 |
| 2,612,724 | Llewellyn | Oct. 7, 1952 |
| 2,654,638 | Elliott | Oct. 6, 1953 |